United States Patent
Goetzinger et al.

(10) Patent No.: US 6,982,986 B2
(45) Date of Patent: Jan. 3, 2006

(54) QOS SCHEDULER AND METHOD FOR IMPLEMENTING QUALITY OF SERVICE ANTICIPATING THE END OF A CHAIN OF FLOWS

(75) Inventors: William John Goetzinger, Rochester, MN (US); Glen Howard Handlogten, Rochester, MN (US); James Francis Mikos, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 10/004,217

(22) Filed: Nov. 1, 2001

(65) Prior Publication Data

US 2003/0081612 A1    May 1, 2003

(51) Int. Cl.
*H04L 12/56* (2006.01)
(52) U.S. Cl. .................... 370/412; 370/468; 370/395.4
(58) Field of Classification Search ............ 370/395.41
See application file for complete search history.

(56) References Cited

U.S. PATENT DOCUMENTS

| | | | |
|---|---|---|---|
| 4,621,359 A | 11/1986 | McMillen |
| 5,249,184 A | 9/1993 | Woeste et al. |
| 5,490,141 A | 2/1996 | Lai et al. |
| 5,548,590 A | 8/1996 | Grant et al. |
| 5,629,928 A | 5/1997 | Calvignac et al. |
| 5,650,993 A | 7/1997 | Lakshman et al. |
| 5,742,772 A | 4/1998 | Sreenan |
| 5,790,545 A | 8/1998 | Holt et al. |

(Continued)

FOREIGN PATENT DOCUMENTS

EP    0859492 A2    8/1998

(Continued)

OTHER PUBLICATIONS

U.S. Appl. No. 10/004,373, filed Nov. 1, 2001, by William John Goetzinger, Glen Howard Handlogten, James Francis Mikos, and David Alan Norgaard entitled "QoS Scheduler and Method for Implementing Peak Service Distance Using Next Peak Service Time Violated Indication".

(Continued)

*Primary Examiner*—Chi Pham
*Assistant Examiner*—Jordan Hamann
(74) *Attorney, Agent, or Firm*—Joan Pennington

(57) ABSTRACT

A QoS scheduler, scheduling method, and computer program product are provided for implementing Quality-of-Service (QoS) scheduling with detecting and anticipating the end of a chain of flows. A first indicator is provided for indicating a number of flows being chained to a physical entry. A second indicator is provided for indicating when the first indicator has saturated. The second indicator is set active for a flow whose chaining causes the first indicator to saturate. During de-chaining of the flows from the physical entry, the second indicator is used to determine when the first indicator becomes accurate to begin decrementing the first indicator. The first indicator is decremented for detecting the end of the chain of flows. Responsive to the first indicator being not saturated, the first indicator is used for anticipating the end of a chain of flows. The first indicator and the second indicator include a predefined number of bits or n-bits. The first indicator includes n−1 bits stored in a physical entry and the second indicator includes 1-bit stored in a chained link list.

20 Claims, 8 Drawing Sheets

U.S. PATENT DOCUMENTS

| | | | |
|---|---|---|---|
| 5,831,971 | A | 11/1998 | Bonomi et al. |
| 5,844,890 | A | 12/1998 | Delp et al. |
| 5,850,399 | A | 12/1998 | Ganmukhi et al. |
| 5,926,459 | A | 7/1999 | Lyles et al. |
| 5,926,481 | A | 7/1999 | Wang et al. |
| 5,946,297 | A | 8/1999 | Calvignac et al. |
| 5,999,963 | A | 12/1999 | Bruno et al. |
| 6,014,367 | A | 1/2000 | Joffe |
| 6,018,527 | A | 1/2000 | Yin et al. |
| 6,028,842 | A | 2/2000 | Chapman et al. |
| 6,028,843 | A | 2/2000 | Delp et al. |
| 6,031,822 | A | 2/2000 | Wallmeier |
| 6,038,217 | A | 3/2000 | Lyles |
| 6,041,059 | A | 3/2000 | Joffe et al. |
| 6,064,650 | A | 5/2000 | Kappler et al. |
| 6,064,677 | A | 5/2000 | Kappler et al. |
| 6,067,301 | A | 5/2000 | Aatresh |
| 6,072,772 | A | 6/2000 | Charny et al. |
| 6,072,800 | A | 6/2000 | Lee |
| 6,078,953 | A | 6/2000 | Vaid et al. |
| 6,081,507 | A | 6/2000 | Chao et al. |
| 6,092,115 | A | 7/2000 | Choundhury et al. |
| 6,094,435 | A | 7/2000 | Hoffman et al. |
| 6,101,193 | A | 8/2000 | Ohba |
| 6,104,700 | A | 8/2000 | Haddock et al. |
| 6,108,307 | A | 8/2000 | McConnell et al. |
| 6,122,673 | A | 9/2000 | Basak et al. |
| 6,144,669 | A | 11/2000 | Williams et al. |
| 6,157,614 | A | 12/2000 | Pasternak et al. |
| 6,157,649 | A | 12/2000 | Peirce et al. |
| 6,157,654 | A | 12/2000 | Davis |
| 6,169,740 | B1 | 1/2001 | Morris et al. |
| 6,188,698 | B1 | 2/2001 | Garland et al. |
| 6,226,267 | B1 | 5/2001 | Spinney et al. |
| 6,229,812 | B1 | 5/2001 | Parruck et al. |
| 6,229,813 | B1 | 5/2001 | Buchko et al. |
| 6,236,647 | B1 | 5/2001 | Amalfitano |
| 6,246,692 | B1 | 6/2001 | Dai et al. |
| 6,356,546 | B1 | 3/2002 | Beshai |
| 6,404,768 | B1 | 6/2002 | Basak et al. |
| 6,469,982 | B1 | 10/2002 | Henrion et al. |
| 6,608,625 | B1 | 8/2003 | Chin et al. |
| 6,646,986 | B1 | 11/2003 | Beshai |
| 6,721,325 | B1 | 4/2004 | Duckering et al. |
| 6,804,249 | B1 | 10/2004 | Bass et al. |
| 6,810,012 | B1 | 10/2004 | Yin et al. |
| 6,813,274 | B1 | 11/2004 | Suzuki et al. |
| 6,850,490 | B1 | 2/2005 | Woo et al. |
| 6,885,664 | B2 | 4/2005 | Ofek et al. |
| 6,888,830 | B1 | 5/2005 | Snyder II et al. |
| 6,891,835 | B2 | 5/2005 | Kalkunte et al. |
| 2002/0023168 | A1 | 2/2002 | Bass et al. |
| 2002/0181455 | A1 | 12/2002 | Norman et al. |
| 2003/0058879 | A1 | 3/2003 | Rumph |

FOREIGN PATENT DOCUMENTS

| | | |
|---|---|---|
| EP | 0957602 A2 | 11/1999 |
| EP | 0989770 A1 | 3/2000 |
| EP | 1049352 A2 | 11/2000 |
| EP | 1061763 A2 | 12/2000 |
| JP | 2000183886 A | 6/2000 |
| JP | 2000295247 A | 10/2000 |
| JP | 2001007822 A | 12/2000 |
| WO | WO99/35792 A1 | 7/1999 |
| WO | WO99/53647 A2 | 10/1999 |
| WO | WO99/53648 A2 | 10/1999 |
| WO | WO01/20876 A1 | 3/2001 |

OTHER PUBLICATIONS

U.S. Appl. No. 10/004,416, filed Nov. 1, 2001, by William John Goetzinger, Glen Howard Handlogten, James Francis Mikos, and David Alan Norgaard entitled "QoS Scheduler and Method for Implementing Quality of Service with Aging Time Stamps".

U.S. Appl. No. 10/004,440, filed Nov. 1, 2001, by William John Goetzinger, Glen Howard Handlogten, James Francis Mikos, and David Alan Norgaard entitled "QoS Scheduler and Method for Implementing Quality of Service with Cached Status Array ".

U.S. Appl. No. 10/016,518, filed Nov. 1, 2001, by William John Goetzinger, Glen Howard Handlogten, James Francis Mikos, and David Alan Norgaard entitled "Weighted Fair Queue Having Extended Effective Range".

U.S. Appl. No. 10/015,994, filed Nov. 1, 2001, by William John Goetzinger, Glen Howard Handlogten, James Francis Mikos, and David Alan Norgaard entitled "Weighted Fair Queue Serving Plural Output Ports".

U.S. Appl. No. 10/015,760, filed Nov. 1, 2001, by William John Goetzinger, Glen Howard Handlogten, James Francis Mikos, and David Alan Norgaard entitled "Weighted Fair Queue Having Adjustable Scaling Factor".

U.S. Appl. No. 10/002,085, filed Nov. 1, 2001, by William John Goetzinger, Glen Howard Handlogten, James Francis Mikos, and David Alan Norgaard entitled "Empty Indicators for Weighted Fair Queues".

U.S. Appl. No. 10/102,166 filed Mar. 20, 2002, "Method and Apparatus for Improving the Fairness of New Attaches to a Weighted Fair Queue in a Quality of Service (QoS) Scheduler".

Abstract of Publication entitled "Design of packet-fair queuing schedulers using a RAM-based searching engine" by HJ Chao et al, IEEE Journal on Selected Areas in Communications, vol. 17, No. 6, pp. 1105-1126, Jun. 1999.

U.S. Appl. No. 10/102,343 filed Mar. 20, 2002, "Network Processor Having Fast Flow Queue Disable Process".

| CHAIN LENGTH 310 | COUNTER INDICATOR 300 | COUNTER ACCURACY INDICATOR 302 | CHAIN STATE 312 |
|---|---|---|---|
| 0 | 00 | X | INITIAL STATE |
| 1 | 01 | X | 1 FLOW ADDED |
| 2 | 10 | 0 | 1 FLOW ADDED |
| 3 | 11 | 1 | 1 FLOW ADDED, COUNTER SATURATES |
| 4 | 11 | 0 | 1 FLOW ADDED |
| 5 | 11 | 0 | 1 FLOW ADDED |
| 4 | 11 | 0 | 1 FLOW REMOVED |
| 3 | 11 | 0 | 1 FLOW REMOVED, COUNTER ACCURATE |
| 2 | 10 | 1 | 1 FLOW REMOVED |
| 1 | 01 | X | 1 FLOW REMOVED |
| 0 | 00 | X | FINAL STATE |

(where, X = DON'T CARE)

FIG. 3B

QOS SCHEDULER AND METHOD FOR IMPLEMENTING QUALITY OF SERVICE ANTICIPATING THE END OF A CHAIN OF FLOWS

FIELD OF THE INVENTION

The present invention relates generally to the storage and data networking fields, and more particularly, relates to a QoS scheduler, scheduling method, and computer program product for implementing Quality-of-Service (QoS) scheduling with detecting and anticipating the end of a chain of flows.

RELATED APPLICATIONS

Related U.S. patent applications by William John Goetzinger, Glen Howard Handlogten, James Francis Mikos, and David Alan Norgaard and assigned to the present assignee are being filed on the same day as the present patent application including:

U.S. patent application Ser. No. 10/004,373, entitled "QoS SCHEDULER AND METHOD FOR IMPLEMENTING PEAK SERVICE DISTANCE USING NEXT PEAK SERVICE TIME VIOLATED INDICATION";

U.S. patent application Ser. No. 10/002,416, entitled "QoS SCHEDULER AND METHOD FOR IMPLEMENTING QUALITY OF SERVICE WITH AGING TIME STAMPS";

U.S. patent application Ser. No. 10/004,440, entitled "QoS SCHEDULER AND METHOD FOR IMPLEMENTING QUALITY OF SERVICE WITH CACHED STATUS ARRAY";

U.S. patent application Ser. No. 10/016,518, entitled "WEIGHTED FAIR QUEUE HAVING EXTENDED EFFECTIVE RANGE";

U.S. patent application Ser. No. 10/015,994, entitled "WEIGHTED FAIR QUEUE SERVING PLURAL OUTPUT PORTS";

U.S. patent application Ser. No. 10/015,760, entitled "WEIGHTED FAIR QUEUE HAVING ADJUSTABLE SCALING FACTOR"; and U.S. patent application Ser. No. 10/002,085, entitled "EMPTY INDICATORS FOR WEIGHTED FAIR QUEUES".

DESCRIPTION OF THE RELATED ART

Storage and data networks are designed to support the integration of high quality voice, video, and high speed data traffic. Storage and data networking promises to provide transparent data sharing services at high speeds. It is easy to see that rapid movement and sharing of diagrams, pictures, movies, audio, and the like requires tremendous bandwidth. Network management is concerned with the efficient management of every bit of available bandwidth.

A need exists for a high speed scheduler for networking that ensures the available bandwidth will not be wasted and that the available bandwidth will be efficiently and fairly allocated. The scheduler should permit many network traffic flows to be individually scheduled per their respective negotiated Quality-of-Service (QoS) levels. This would give system administrators the ability to efficiently tailor their gateways, switches, storage area networks (SANs), and the like. Various QoS can be set up using combinations of precise guaranteed bandwidth, required by video for example, and limited or unlimited best effort bandwidth for still pictures, diagrams, and the like. Selecting a small amount of guaranteed bandwidth with the addition of some bandwidth from the pool of best effort bandwidth should guarantee that even during the highest peak periods, critical data will be delivered to its application at that guaranteed rate.

A scheduler advantageously may be added to a network processor to enhance the quality of service (QoS) provided by the network processor subsystem.

Many times, multiple flows compete for the same physical queue entry; since there is only a single physical queue entry at that point only one of the flow identifiers is stored in the entry while the remaining flows are chained to the flow entry using a linked list. When the selection algorithm identifies an entry to be serviced, the flow identification is read and the next flow in the chain is written to the entry, and the selection process begins again. The same entry may or may not be selected for servicing, depending on many QoS factors.

A need exists for a method to determine that the end of the chain has been reached, removing the entry from the selection process. As the speed of scheduling increases, it has become impractical to wait for the final flow in the chain to be read from memory and written to the physical queue for subsequent searching or determining that the flow is the end of the flow chain. This requires that the end of chain be anticipated to allow at speed scheduling.

SUMMARY OF THE INVENTION

A principal object of the present invention is to provide a QoS scheduler, scheduling method, and computer program product for implementing Quality-of-Service (QoS) scheduling with detecting and anticipating the end of a chain of flows. Other important objects of the present invention are to provide such QoS scheduler, scheduling method, and computer program product for implementing Quality-of-Service (QoS) scheduling with detecting and anticipating the end of a chain of flows substantially without negative effect and that overcome many of the disadvantages of prior art arrangements.

In brief, a QoS scheduler, scheduling method, and computer program product are provided for implementing Quality-of-Service (QoS) scheduling with detecting and anticipating the end of a chain of flows. A first indicator is provided for indicating a number of flows being chained to a physical entry. A second indicator is provided for indicating when the first indicator has saturated. The second indicator is set active for a flow whose chaining causes the first indicator to saturate. During de-chaining of the flows from the physical entry, the second indicator is used to determine when the first indicator becomes accurate to begin decrementing the first indicator. The first indicator is decremented for detecting the end of the chain of flows. Responsive to the first indicator being not saturated, the first indicator is used for anticipating the end of a chain of flows.

In accordance with features of the invention, the first indicator and the second indicator include a predefined number of bits or n-bits. The first indicator includes n−1 bits stored in a physical entry and the second indicator includes 1-bit stored in a chained link list.

BRIEF DESCRIPTION OF THE DRAWINGS

The present invention together with the above and other objects and advantages may best be understood from the following detailed description of the preferred embodiments of the invention illustrated in the drawings, wherein:

FIG. 3B is a diagram illustrating the operation of the pair of novel indicators of FIG. 3A as a chain of flows is built to a length of 5 and then reduced to a length of 0;

DETAILED DESCRIPTION OF THE PREFERRED EMBODIMENTS

Figure 1A:
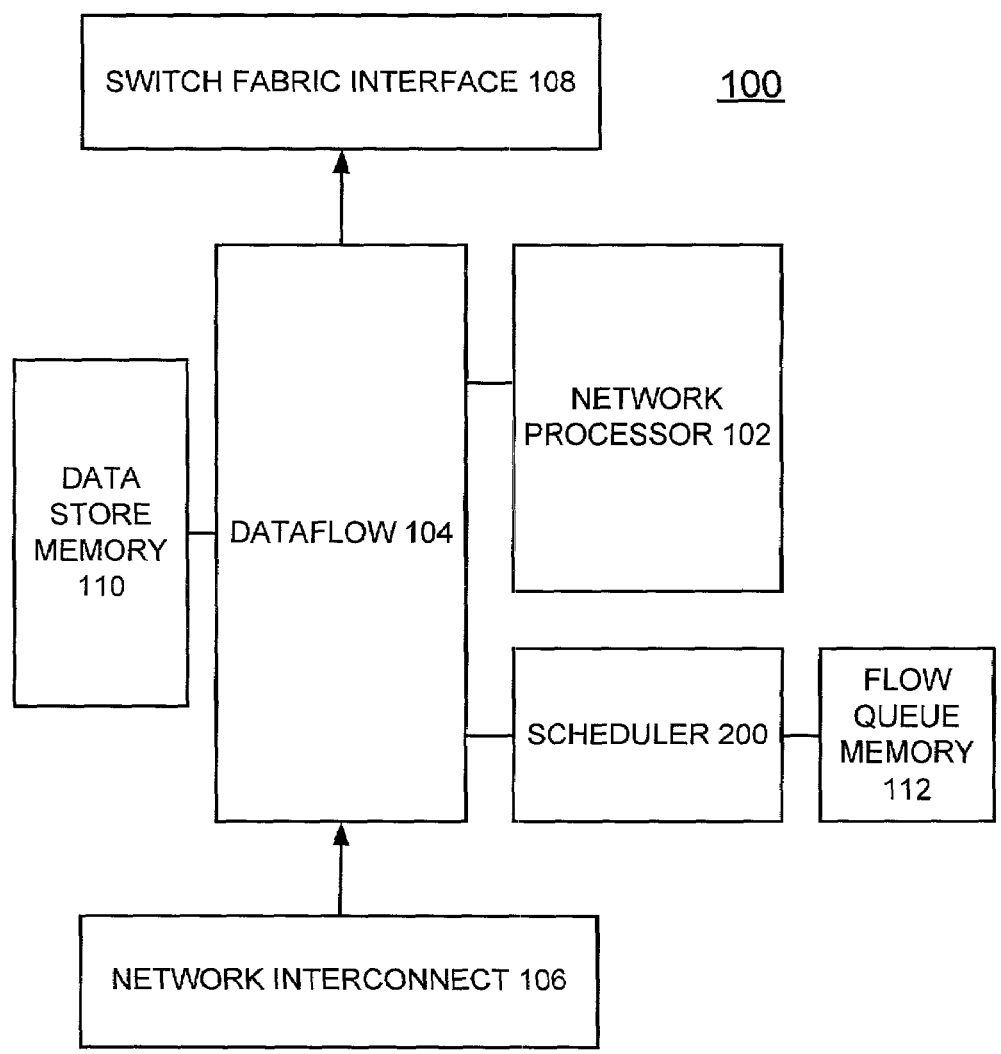
FIG. 1A is a block diagram illustrating a network processor system including a scheduler for carrying out scheduling methods for implementing Quality-of-Service (QoS) scheduling with detecting and anticipating the end of a chain of flows of the preferred embodiment.

Having reference now to the drawings, in FIG. 1A, there is shown a network processor system generally designated by the reference character 100 including a QoS scheduler 200 for carrying out scheduling methods for implementing Quality-of-Service (QoS) scheduling with detecting and anticipating the end of a chain of flows in accordance with the preferred embodiment. As shown in FIG. 1A, network processor system 100 includes a network processor 102 that executes software responsible for forwarding network traffic. Network processor 102 includes hardware assist functions for performing operations, such as table searches, policing, and statistics tracking. A dataflow 104 serves as the primary data path for transmitting and receiving data flow traffic, for example, via a network interconnect 106 and/or a switch fabric interface 108. Dataflow 104 provides an interface to a large data store memory 110 for buffering of traffic bursts when an incoming frame rate exceeds an outgoing frame rate. An external flow queue memory 112 is coupled to scheduler 200. As performance of network processor 102 continues to increase, unique techniques and design solutions enable the QoS scheduler 200 to perform reliably at these high data rates.

Scheduler 200 of the preferred embodiment permits many network traffic flows, for example, 64 thousand (64K) network traffic flows to be individually scheduled per their respective assigned Quality-of-Service (QoS) level. Each flow is basically a one-way connection between two different points. QoS parameters are held in a flow queue control block (FQCB), such as in the external flow queue memory 112. QoS parameters include sustained service distance (SSD), peak service distance (PSD), queue distance (QD), port identification (ID), and the like. There can be, for example, 64 thousand flows and a FQCB for each flow.

Figure 1B:
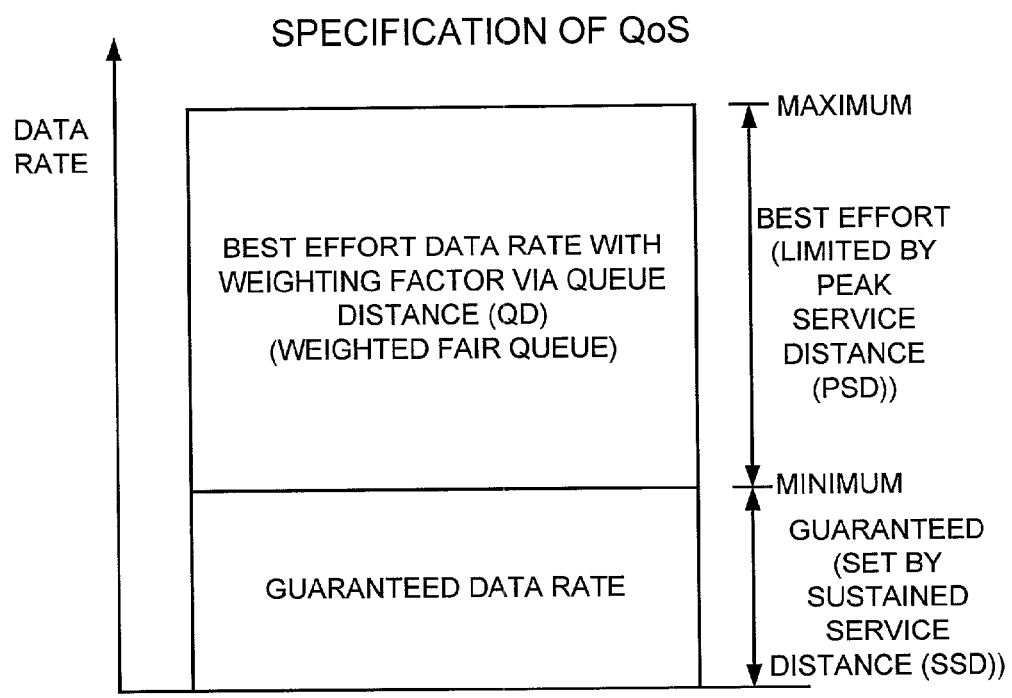
FIG. 1B is diagram providing a graphical illustration of various types of QoS algorithms in accordance with the preferred embodiment.

FIG. 1B provides a graphical illustration of various types of QoS algorithms. The scheduler 200 provides for quality of service by maintaining flow queues that may be scheduled using various algorithms, such as a set guaranteed bandwidth, or best effort or weighted fair queue (WFQ) with or without a peak bandwidth service (PBS) limit. The best effort or weighted fair queue is limited via the peak service distance (PSD) QoS parameter. The guaranteed bandwidth is set via the sustained service distance (SSD) QoS parameter. A combination of these algorithms provide efficient utilization of available bandwidth. The scheduler 200 supplements the congestion control algorithms of dataflow 104 by permitting frames to be discarded based on per flow queue thresholds.

Figure 2:
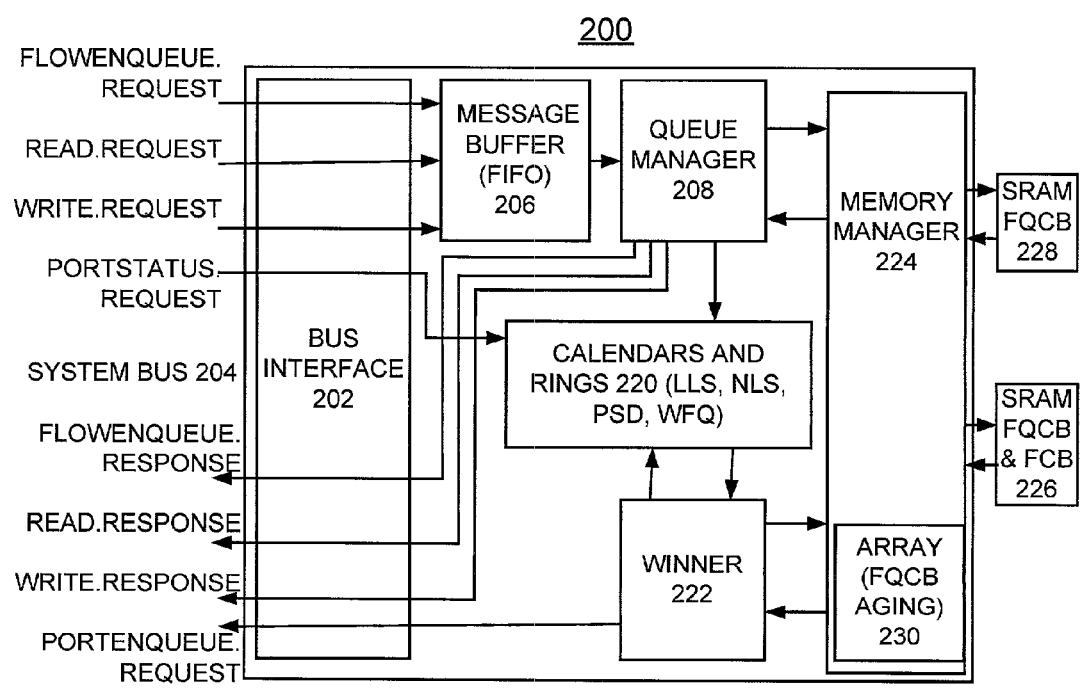
FIG. 2 is a high-level system diagram illustrating the QoS scheduler for carrying out scheduling methods for implementing Quality-of-Service (QoS) scheduling with detecting and anticipating the end of a chain of flows of the preferred embodiment.

Referring now to FIG. 2, there is shown a high-level diagram illustrating the scheduler 200 for carrying out scheduling methods of the preferred embodiment. Scheduler 200 includes a bus interface 202 coupled to a system bus 204 interconnecting modules in the system 100. Chipset messages are exchanged between modules using system bus 204. Messages include flow enqueue requests which add frames to a given flow and read and write requests. Scheduler 200 includes a message buffer 206, such as a first-in first-out (FIFO) message buffer, that stores messages until they are ready to be executed. Scheduler 200 includes a queue manager 208 coupled to the message buffer 206. Queue manager 208 processes the incoming messages to determine what action is required. Queue manager 208 is coupled to calendars and rings block 220 and a memory manager 224. A winner partition 222 arbitrates between the calendars and rings 220 to choose which flow will be serviced next. The memory manager 224 coordinates data reads from and writes to a first and second external static random access memory (SRAM) 226 and 228 and an internal memory array 230.

For a flow enqueue request received by queue manager 208, the flow's FQCB information is retrieved from one of the external SRAM 226 or 228 or internal array 230 and examined to determine if the new frame should be added to an existing frame string for a given flow, start a new frame string, or be discarded. In addition, the flow queue may be attached to a calendar or ring for servicing in the future. Read and write request messages received by queue manager 208 are used to initialize flows.

Port back-pressure from the dataflow 104 to the scheduler 200 occurs via the port status request message originated from the dataflow and applied to the calendar and rings block 220. When a port threshold is exceeded, all WFQ and PBS traffic associated with that port is held in the scheduler 200 and the selection logic of winner partition 222 does not consider those flows potential winners. When port back-pressure is removed, the flows associated with that port are again eligible to be winners.

Calendars and rings block 220 includes, for example, three calendars (low latency service (LLS), normal latency service (NLS), peak bandwidth service (PBS)) and weighted fair queues (WFQs). The calendars are time based. The weighted fair queues (WFQs) are weight based. The WFQs are also referred to as best effort queues because WFQs can only schedule excess bandwidth and therefore can have no bandwidth guarantee associated with them.

Flows are attached to one or more of three calendars (LLS, NLS, PBS) and one WFQ ring 220 in a manner consistent with its QoS parameters. For example, if a flow has a guaranteed bandwidth component, it is attached to a time based calendar. If a flow has a WFQ component, it is attached to the WFQ ring. A flow may have both a guaranteed and best effort or WFQ component. The calendars 220 are used to provide guaranteed bandwidth with both a low latency service (LLS) and a normal latency service (NLS) packet rate. Flows are scheduled for service at a certain time in the future. WFQ rings are used by the weighted fair queuing algorithm. Entries are chosen based upon position in the WFQ rings 220 without regard to time. The WFQ rings 220 are work conserving or idle only when there are no flows to be serviced. A flow set up using a WFQ ring can optionally have a peak bandwidth limit associated with it.

Scheduler 200 performs high speed scheduling, for example, processing 27 Million frames per second (Mframes/second). Scheduling rates per flow for the LLS, NLS and PBS calendars 220 range, for example, from 10 Giga bits per second (Gbps) to 3.397 Thousand bits per second (Kbps). Rates do not apply to the WFQ ring.

SRAM 226 is an external high speed, for example, quad data rate (QDR) SRAM containing flow queue information or flow queue control block (FQCB) information and frame information or frame control block (FCB) information. SRAM 228 is, for example, an optional external QDR SRAM containing flow queue information or flow queue control block (FQCB) depending on the number of flows. Internal array 230 contains for example, 4K FQCB or 64K aging information. Internal array 230 may be used in place of the external SRAM 228 if less than four thousand (4K) flows are required and is also used to hold time stamp aging information. Internal array 230 containing FQCB aging information is used with logic that searches through the flows and invalidates expired time stamps.

Queue manager 208 performs the queuing operation of scheduler 200 generally as follows: A linked list or string of frames is associated with each flow. Frames are always enqueued to the tail of the linked list. Frames are always dequeued from the head of the linked list. Flows are attached to one or more of four calendars/rings (LLS, NLS, PBS, WFQ) 220 using the QoS parameters. Selection of which flow to service is done by examining the calendars/rings 220 in the order of LLS, NLS, PBS, WFQ. Then the frame at the head of the selected flow is selected for service. The flow queues are not grouped in any predetermined way to target port. The port number for each flow is user programmable. All WFQ flows with the same port ID are attached to the same WFQ ring. The QoS parameters also apply to the discard flow. The discard flow address is user selectable and is set up at configuration time.

When a flow enqueue request is sent to the scheduler 200, its frame is tested for possible discard using information from the flow enqueue request message and information stored in the FQCB. If the frame is to be discarded then the FQCB pointer is changed from the FQCB in flow enqueue request message to the discard FQCB. Alternatively, the frame is added to the tail end of the FCB chain associated with the FQCB. In addition, the flow is attached if it is not already attached to the appropriate calendar (LSS, NLS, PBS), or ring (WFQ). As time passes, selection logic of winner partition 222 determines which flow is to be serviced (first LLS, then NLS, then PBS, then WFQ). If a port bandwidth threshold has been exceeded, the WFQ and PBS component associated with that port are not eligible to be selected. When a flow is selected as the winner, the frame at the head of the FCB chain for the flow is dequeued and a port enqueue response message is issued to the dataflow 104. If the flow is eligible for a calendar reattach, the flow is reattached to the appropriate calendar (LLS, NLS, PBS, or WFQ) in a manner consistent with the QoS parameters.

To implement QoS scheduling, entries in physical queues representing either time or weight relationships between flows are used to store flow identification information. Algorithms search to find occupied entries and read the contents to determine the flow that is to be serviced next.

In accordance with features of the preferred embodiment, the prior art problems of detecting the end of chain and anticipating the end of chain in a manner consistent with a high speed scheduling implementation are addressed while adding minimal hardware. A scheduling method of the preferred embodiment determines that the end of a chain of flows on a calendar entry or ring entry has been reached so that the entry can be removed from the selection process; and that anticipates the end of chain to allow at speed scheduling.

Figure 3A:
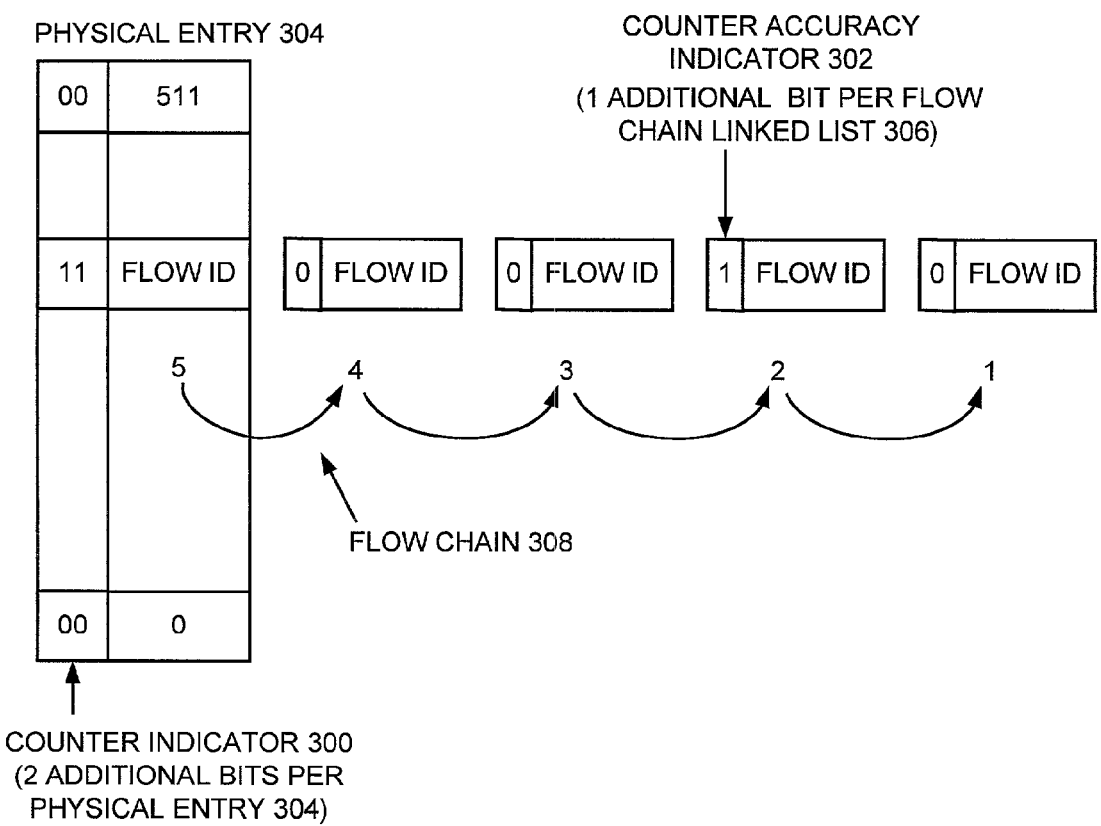
FIG. 3A is a diagram illustrating a pair of novel indicators provided in accordance with the preferred embodiment for implementing Quality-of-Service (QoS) scheduling with detecting and anticipating the end of a chain of flows.

FIG. 3A illustrates a pair of novel indicators 300 and 302 provided in accordance with the preferred embodiment for implementing Quality-of-Service (QoS) scheduling anticipating the end of a chain of flows. Indicator 300 consists of, for example, two additional bits stored in each physical entry 304 and the indicator 302 includes one additional bit stored in each flow chain linked list 306. Initially, the physical entry 304 is empty. Flow 1 arrives and is written to the entry. Flow 2 arrives and is written to the entry, and contains a pointer to flow 1. Flow 3 arrives and is written to the entry, and contains a pointer to flow 2, and the like. When the chain has length 5, the ordering is: flow 5>flow 4>flow 3>flow 2>flow 1. FIG. 3A illustrates chaining of 5 flows in a flow chain 308.

In the preferred embodiment, the 2-bit indicator 300 in the physical entry 304 acts as a counter that saturates at a maximum value of 3, while the 1-bit indicator 302 in the chain linked list 306 is an indicator of the accuracy of the counter. The key transition is that as the chain 308 is reduced, the 1-bit indicator 302 in the chain linked list 306 indicates when the 11 value of 2-bit indicator 300 in the physical entry 304 is valid, which enables the 2-bit counter indicator 300 to not only detect, but also anticipate the end of chain.

It should be understood that the present invention is not limited to the 3-bit implementation for indicators 300 and 302. The 3-bit implementation is optimized to provide sufficient end of chain anticipation while minimizing additional hardware required to implement the invention. This invention is easily extended beyond the 3-bit implementations, mainly to an n-bit implementation where n−1 bits of indicator 300 in the physical entry 304 act as a counter that saturates at a maximum value ($2^{n-1}-1$), while the 1 bit of indicator 302 in chain linked list 306 is an indicator of the accuracy of the counter.

Referring also to FIG. 3B, the 2-bit indicator 300 in physical queue entry 304 is a count of the number of flows attached to the entry and saturates at a value of 3. When this occurs, the 1-bit indicator 302 in the linked list 306 is set at 1 to indicate saturation. If a 4th flow is chained, its 1-bit indicator 302 in the linked list 306 is set at 0. The linked list 1-bit indicator 302 for all subsequent flows is also set to 0. Upon de-chaining, when flow 2 entry is accessed, its linked list 1-bit indicator 302 is 1, indicating that the 2-bit indicator 300 in physical queue entry 304 is once again accurate and is used to anticipate the end of chain. In FIG. 3B, the indicators 300 and 302 operate as shown as the chain 308 is built up to a length of 5 and then reduced to length of 0.

Figure 4:
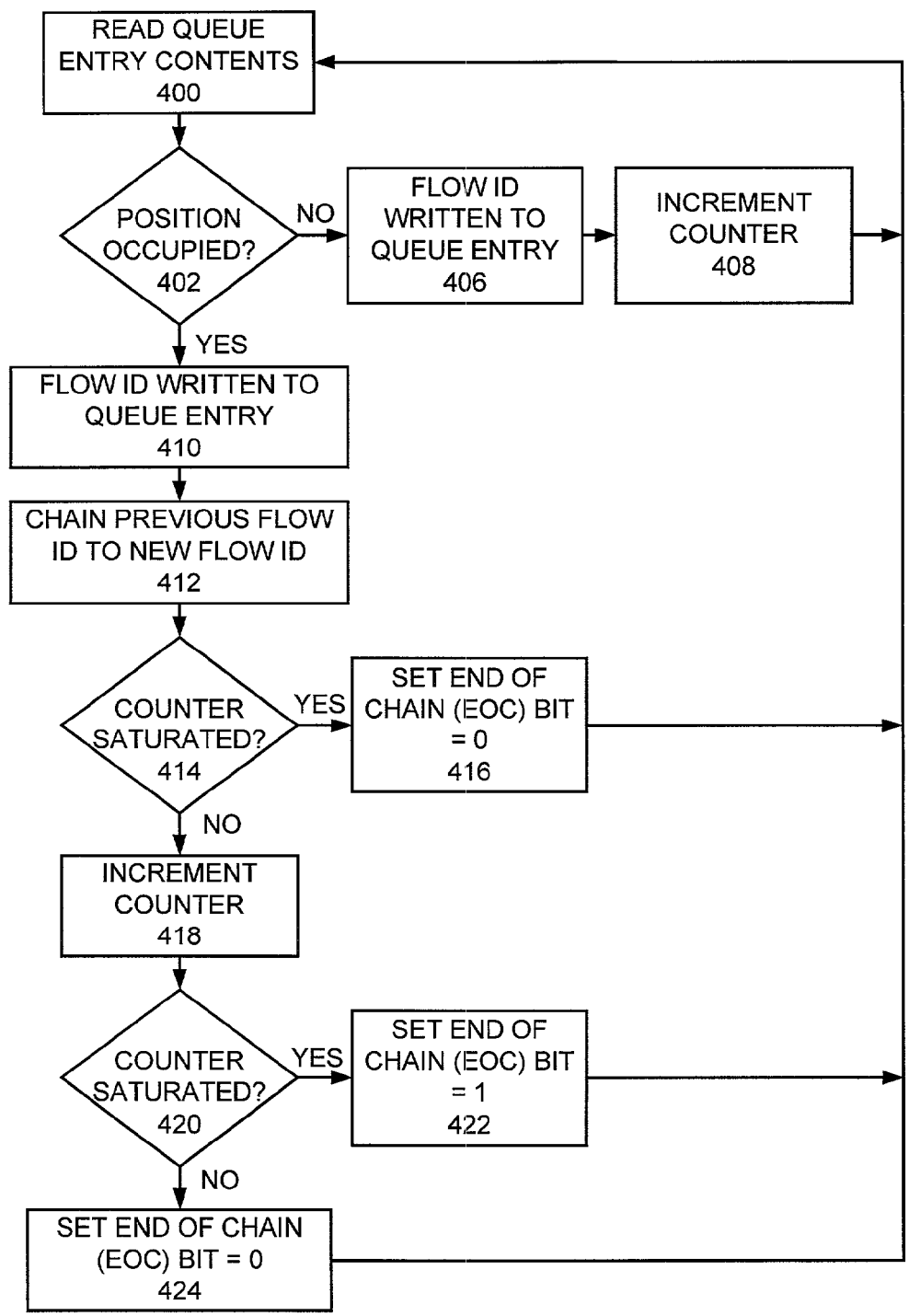
FIGS. 4 and 5 are flow charts illustrating exemplary sequential steps for carrying out scheduling methods for implementing Quality-of-Service (QoS) scheduling with detecting and anticipating the end of a chain of flows of the preferred embodiment.
Figure 5:
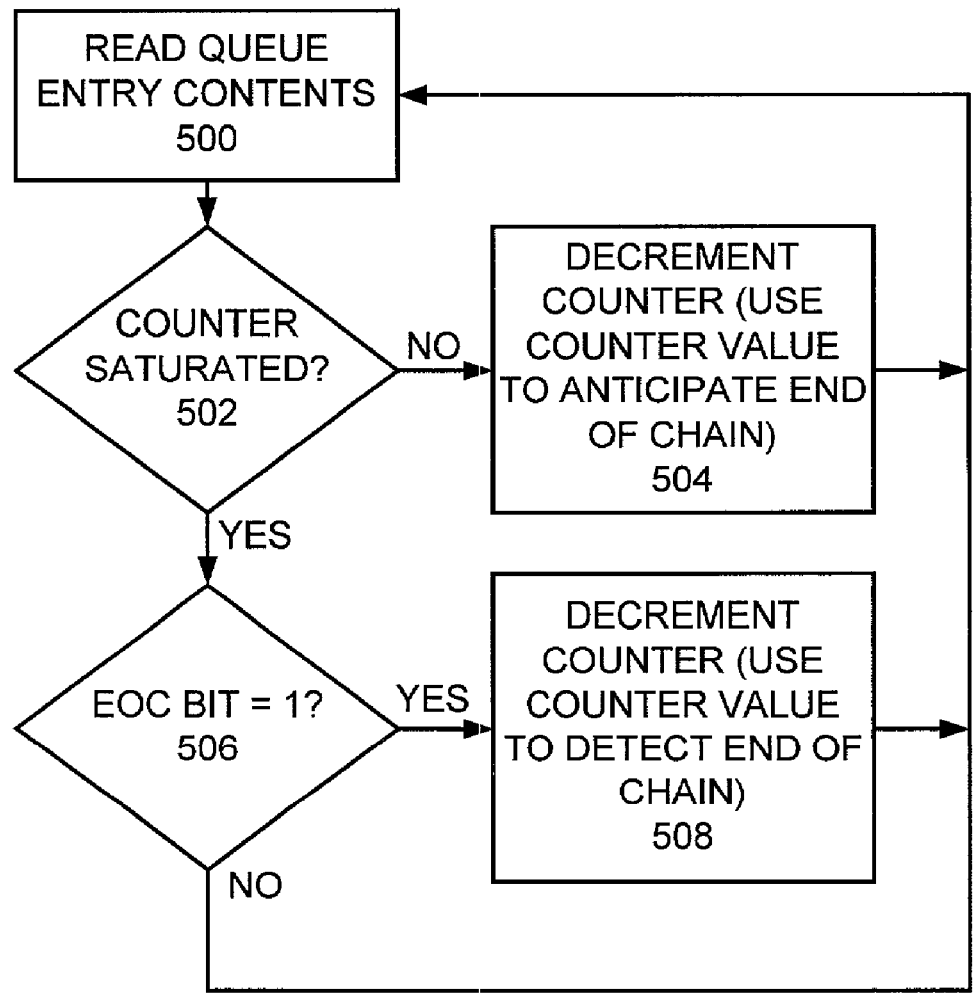

FIGS. 4 and 5 are flow charts illustrating exemplary sequential steps for carrying out scheduling methods for implementing Quality-of-Service (QoS) scheduling with detecting and anticipating the end of a chain of flows of the preferred embodiment. FIG. 4 illustrates a chaining portion of the invention. FIG. 5 illustrates a de-chaining portion of the invention.

Referring now to FIG. 4, exemplary sequential steps for chaining flows begin with queue entry contents of a physical queue entry 304 being read for adding a flow to the entry as indicated in a block 400. Checking for the position being occupied is performed as indicated in a decision block 402. If the position is not occupied, the flow ID is written to the physical queue entry 304 as indicated in a block 406. Then the counter value of indicator 300 is incremented as indicated in a block 408. Then the sequential operations can return to block 400 and queue entry contents are read for adding a flow to the entry. If the position is occupied, the flow ID is written to the physical queue entry 304 as indicated in a block 410. Then the previous flow ID is chained to the new flow ID as indicated in a block 412. Checking for counter saturation is performed as indicated in a decision block 414. If the counter value of indicator 300 is saturated, then the end of chain (EOC) bit of indicator 302 is reset as indicated in a block 416. Then the sequential operations can return to block 400 and queue entry contents are read for adding a flow to the entry. If the counter value of indicator 300 is not saturated, then the counter value of indicator 300 is incremented as indicated in a block 418. Checking for counter saturation is performed as indicated in a decision block 420. If the counter value of indicator 300 is saturated, then the end of chain (EOC) bit of indicator 302 is set as indicated in a block 422. Then the sequential operations can return to block 400 and queue entry contents are read for adding a flow to the entry. If the counter value of indicator 300 is not saturated, then the end of chain (EOC) bit of indicator 302 is reset as indicated in a block 424. Then the sequential operations can return to block 400 and queue entry contents are read for adding a flow to the entry.

Referring now to FIG. 5, exemplary sequential steps for de-chaining flows begin with queue entry contents of a physical queue entry 304 being read as indicated in a block 500. Checking if the counter value of indicator 300 is saturated is performed as indicated in a decision block 502. If the counter value of indicator 300 is not saturated, then the counter value of indicator 300 is used for anticipating the end of chain and the counter value of indicator 300 is decremented as indicated in a block 504. Then the sequential operations return to block 500 and queue entry contents are read. If the counter value of indicator 300 is saturated, then checking if the end of chain (EOC) bit of indicator 302 is set is performed as indicated in a decision block 506. If the end of chain (EOC) bit of indicator 302 is set, then the counter value of indicator 300 is used to detect the end of chain and the counter value of indicator 300 is decremented as indicated in a block 508. Then the sequential operations return to at block 500 and queue entry contents are read. If the end of chain (EOC) bit of indicator 302 is not set, then the sequential operations return to at block 500 without decrementing the counter value of indicator 300 and queue entry contents are read.

Figure 6:
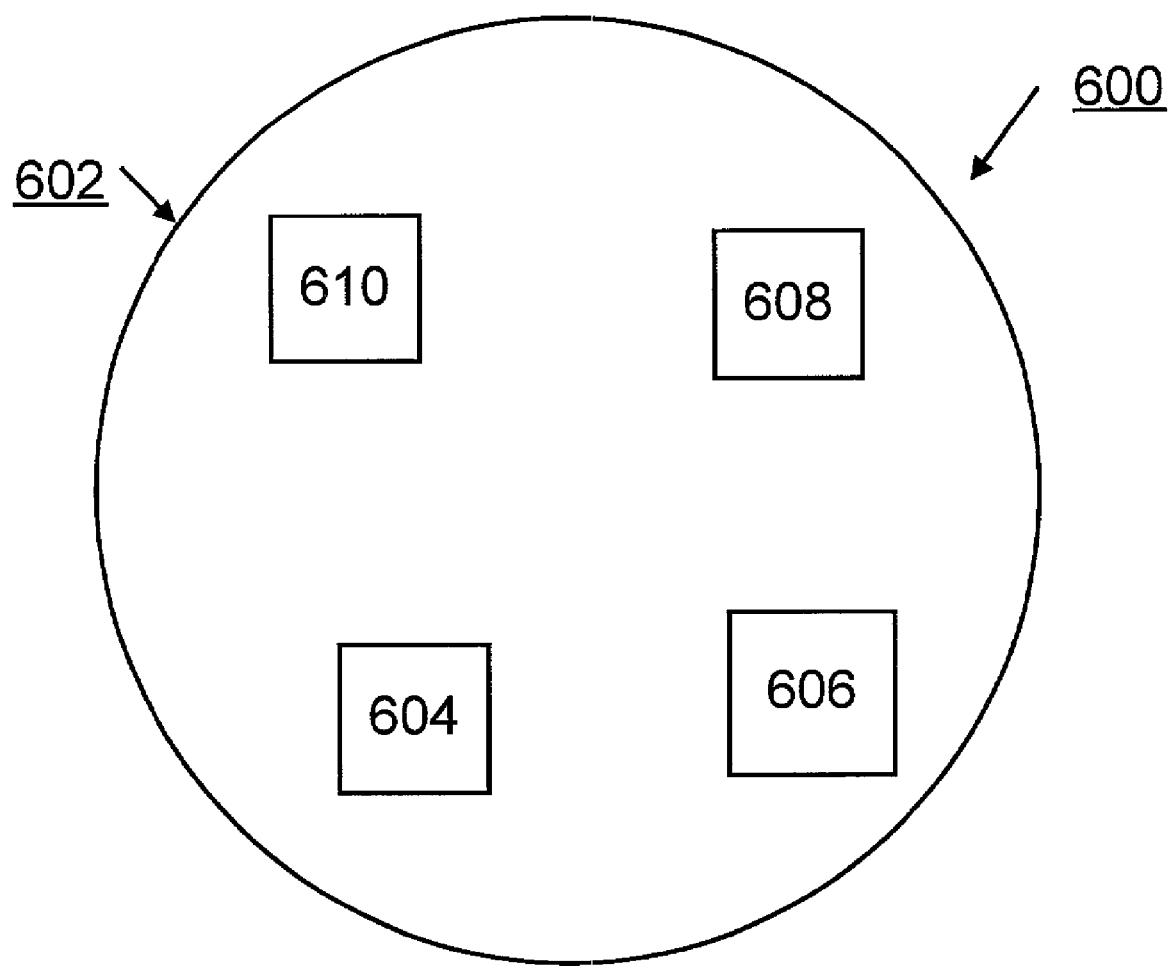
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out scheduling methods for implementing Quality-of-Service (QoS) scheduling detecting and anticipating the end of a chain of flows of the preferred embodiment in the system 100 of FIG. 1.

A sequence of program instructions or a logical assembly of one or more interrelated modules defined by the recorded program means 604, 606, 608, 610, direct the computer system 100 for carrying out scheduling methods for implementing Quality-of-Service (QoS) scheduling detecting and anticipating the end of a chain of flows of the preferred embodiment.

While the present invention has been described with reference to the details of the embodiments of the invention shown in the drawing, these details are not intended to limit the scope of the invention as claimed in the appended claims.

What is claimed is:

1. A QoS scheduler for implementing Quality-of-Service (QoS) scheduling with detecting and anticipating the end of a chain of flows comprising:
    a first indicator for indicating a number of flows being chained to a physical entry;
    a second indicator for indicating when said first indicator has saturated; said second indicator being set active for a flow whose chaining causes said first indicator to saturate;
    during de-chaining of said flows from said physical entry, said second indicator being used to determine when said first indicator becomes accurate to begin decrementing said first indicator for detecting the end of the chain of flows; and after said first indicator is decremented, said first indicator being not saturated for anticipating the end of a chain of flows.

2. A QoS scheduler for implementing Quality-of-Service (QoS) scheduling as recited in claim 1 wherein said first indicator and said second indicator include a predefined number of bits (n-bits).

3. A QoS scheduler for implementing Quality-of-Service (QoS) scheduling as recited in claim 2 wherein said first indicator includes n−1 bits and wherein said second indicator includes 1-bit.

4. A QoS scheduler for implementing Quality-of-Service (QoS) scheduling as recited in claim 2 wherein said flow whose chaining causes said first indicator to saturate equals a chained flow number of $(2^{n-1}-1)$.

5. A QoS scheduler for implementing Quality-of-Service (QoS) scheduling as recited in claim 2 wherein said first indicator and said second indicator include three bits (3-bits).

6. A QoS scheduler for implementing Quality-of-Service (QoS) scheduling as recited in claim 5 wherein said first indicator includes 2-bits and said second indicator includes 1-bit.

7. A QoS scheduler for implementing Quality-of-Service (QoS) scheduling as recited in claim 6 wherein said flow whose chaining causes said first indicator to saturate equals a chained flow number of $(2^{n-1}-1)$ or three and wherein second indicator is set active.

8. A QoS scheduler for implementing Quality-of-Service (QoS) scheduling as recited in claim 1 wherein said second indicator being active during de-chaining of said flows from said physical entry for said chained flow number of $(2^{n-1}-1)$ or three, indicates said first indicator becomes accurate to begin decrementing said first indicator for detecting the end of the chain of flows; and said first indicator being not saturated for anticipating the end of a chain of flows.

9. A QoS scheduler for implementing Quality-of-Service (QoS) scheduling as recited in claim 1 wherein said first indicator is stored in said physical queue entry.

10. A QoS scheduler for implementing Quality-of-Service (QoS) scheduling as recited in claim 1 wherein said second indicator is stored in a chain linked list of the chain of flows.

11. A scheduling method for implementing Quality-of-Service (QoS) scheduling with detecting and anticipating the end of a chain of flows comprising the step of:
during chaining of flows to a physical entry; providing a first indicator for indicating a number of flows being chained to a physical entry;
providing a second indicator for indicating when said first indicator has saturated; setting said second indicator active for a flow whose chaining causes said first indicator to saturate;
during de-chaining of flows from said physical entry, responsive to identifying second indicator as being set active, decrementing said first indicator; responsive to decrementing said first indicator, identifying said first indicator as not saturated for anticipating the end of a chain of flows; and said first indicator being decremented for detecting the end of the chain of flows.

12. A scheduling method for implementing Quality-of-Service (QoS) scheduling with detecting and anticipating the end of a chain of flows as recited in claim 11 wherein the steps of providing said first indicator and providing said second indicator includes the steps of providing a predefined number of bits (n-bits) for said first indicator and said second indicator; utilizing n−1 bits for said first indicator and utilizing 1-bit for said second indicator.

13. A scheduling method for implementing Quality-of-Service (QoS) scheduling with detecting and anticipating the end of a chain of flows as recited in claim 12 wherein the step of setting said second indicator active for said flow whose chaining causes said first indicator to saturate includes the step of setting said second indicator active for a flow number equal to a maximum value of said first indicator of $(2^{n-1}-1)$.

14. A scheduling method for implementing Quality-of-Service (QoS) scheduling with detecting and anticipating the end of a chain of flows as recited in claim 13 includes the steps of setting said second indicator inactive for all flow numbers being chained to said physical entry greater than said maximum value of said first indicator of $(2^{n-1}-1)$.

15. A scheduling method for implementing Quality-of-Service (QoS) scheduling with detecting and anticipating the end of a chain of flows as recited in claim 11 wherein the steps during de-chaining of flows from said physical entry, responsive to identifying second indicator as being set active, decrementing said first indicator; responsive to decrementing said first indicator, identifying said first indicator as not saturated for anticipating the end of a chain of flows; and said first indicator being decremented for detecting the end of the chain of flows includes the steps of checking said first indicator value for being saturated; responsive to said first indicator value being saturated, checking said second indicator for being active; and responsive to said second indicator not being active, maintaining said first indicator.

16. A scheduling method for implementing Quality-of-Service (QoS) scheduling with detecting and anticipating the end of a chain of flows as recited in claim 15 wherein the step of identifying said first indicator as not being saturated for anticipating the end of a chain of flows further includes the steps, responsive to said first indicator not being saturated, utilizing a counter value of said first indicator for anticipating the end of a chain of flows.

17. A computer program product for implementing Quality-of-Service (QoS) scheduling of a plurality of flows with detecting and anticipating the end of a chain of flows, said computer program product including a plurality of computer executable instructions stored on a computer readable medium, wherein said instructions, when executed by said scheduler, cause said scheduler to perform the steps of:
storing a first indicator in a physical entry for indicating a number of flows being chained to said physical entry;
storing a second indicator in a chain linked list of the chain of flows for indicating when said first indicator has saturated; setting said second indicator active for a flow whose chaining causes said first indicator to saturate;
during de-chaining of said flows from said physical entry, using said second indicator to determine when said first indicator becomes accurate to begin decrementing said first indicator for detecting the end of the chain of flows; and after said first indicator is decremented, anticipating the end of the chain of flows responsive to said first indicator being not saturated.

18. A computer program product for implementing Quality-of-Service (QoS) scheduling of a plurality of flows with detecting and anticipating the end of a chain of flows as recited in claim 17 wherein the steps of storing said first indicator and storing said second indicator includes the steps of storing n−1 bits for said first indicator in said physical entry for indicating a number of flows being chained to said physical entry and storing 1-bit for said second indicator in said chain linked list of the chain of flows for indicating when said first indicator has saturated.

19. A computer program product for implementing Quality-of-Service (QoS) scheduling of a plurality of flows with detecting and anticipating the end of a chain of flows as recited in claim 18 wherein the step of setting said second indicator active for said flow whose chaining causes said first indicator to saturate includes the step of setting said second indicator active for a flow number equal to a maximum value of said first indicator of $(2^{n-1}-1)$.

20. A computer program product for implementing Quality-of-Service (QoS) scheduling of a plurality of flows with detecting and anticipating the end of a chain of flows as recited in claim 19 includes the steps of setting said second indicator inactive for all flow numbers being chained to said physical entry greater than said maximum value of said first indicator of $(2^{n-1}-1)$.

* * * * *